US005308556A

United States Patent [19]

Bagley

[11] Patent Number: 5,308,556

[45] Date of Patent: May 3, 1994

[54] METHOD OF MAKING EXTRUSION DIES FROM POWDERS

[75] Inventor: Rodney D. Bagley, Big Flats, N.Y.

[73] Assignee: Corning Incorporated, Corning, N.Y.

[21] Appl. No.: 21,487

[22] Filed: Feb. 23, 1993

[51] Int. Cl.[5] ........................ B29B 9/00; B32B 18/00; B29C 65/00

[52] U.S. Cl. ........................................ 264/13; 156/89; 249/64; 249/142; 264/43; 264/60; 264/63; 264/66; 264/67; 264/570; 419/36; 419/44

[58] Field of Search ..................... 264/56, 63, 67, 156, 264/60, 125, 13, 43, 66, 570; 419/26, 36, 38, 44; 156/89; 249/142, 64

[56] References Cited

U.S. PATENT DOCUMENTS

| | | | |
|---|---|---|---|
| 323,680 | 8/1885 | Holden | 210/498 |
| 2,615,202 | 10/1952 | Talalay | 249/142 |
| 3,012,284 | 12/1961 | Touhey, Jr. | 249/142 |
| 3,304,046 | 2/1967 | Miller, Jr. | 249/142 |
| 3,652,378 | 3/1972 | Mistler | 156/89 |
| 3,790,654 | 2/1974 | Bagley | 65/86 |
| 3,803,951 | 4/1974 | Bagley | 76/107 R |
| 4,574,459 | 3/1986 | Peters | 29/527.4 |
| 4,579,705 | 4/1986 | Matsuoka et al. | 264/67 |
| 4,687,433 | 8/1987 | Ozaki et al. | 425/464 |
| 5,019,307 | 5/1991 | Brewer | 264/67 |
| 5,053,092 | 10/1991 | Lachman | 156/89 |
| 5,066,215 | 11/1991 | Peters et al. | 425/464 |

FOREIGN PATENT DOCUMENTS

| | | |
|---|---|---|
| 0293269 | 11/1988 | European Pat. Off. . |
| 0336750 | 10/1989 | European Pat. Off. . |

*Primary Examiner*—Jan H. Silbaugh
*Assistant Examiner*—Christopher A. Fiorilla
*Attorney, Agent, or Firm*—Angela N. Nwaneri

[57] ABSTRACT

A method of forming an extrusion die fabricated from sinterable ceramic or metal powders, for use in forming honeycomb monolith structures including machining of the die in the green state or after partial densification. Alternatively, all or part of the machining can be performed after full densification or sintering.

29 Claims, 4 Drawing Sheets

METHOD OF MAKING EXTRUSION DIES FROM POWDERS

BACKGROUND OF THE INVENTION

The invention relates to a method of fabricating objects having narrow intersecting slots, such as dies, from powders by forming slots and holes in a pre-form before it is sintered.

Typically, dies for cellular extrusions are formed from solid steel blocks by drilling feed holes in the entrance portion of the die and cutting slots in the exit portion of the die such that the holes generally intersect the slots. Dies can also be made by stacking plates which have the appropriate feed holes and slots so that they generally intersect when stacked.

Monolithic dies for extruding cellular structures are usually made using straight round feed holes which communicate from the inlet side of the die to the slots in the outlet face of the die. This is because straight round feed holes are often easier and least expensive to make. However, straight round holes can lead to problems since shoulders are formed where the holes intersect with the slots. In addition to the problem of high wear, this creates high back pressure during extrusion. There are other problems associated with the traditional method of forming dies. For example, for very thin-walled cellular extrusions which require thin slots, dies made by the above methods have proved both difficult and expensive due to the extra processing steps often required to produce useful dies. For example, it has been suggested to coat the slots in certain dies for example, with iron boride, chromium carbide, aluminum oxide, titanium carbide and the like, in order to produce narrow slots.

To avoid the sometimes abrupt changes in cross-sectional area of the feed holes at their junctions with the discharge slots, it has been suggested in co-assigned U.S. Pat. No. 5,066,215 issued to Peters et al., to form feed holes having a gradual or continuous transition of flow cross-sectional area and shape commencing at the entrance portion or end of the feed hole and terminating at the exit portion or end of the feed holes, where longitudinal and lateral flow through discharge slots commences. In the reference die, the cross-sectional area at any location along the length of any feed hole is less than at any location upstream thereof. While the suggested die eliminates the high bending forces on the die and also substantially reduces abrasive wear, it is relatively expensive to manufacture since each hole and slot combination must be cut individually.

It is therefore, the object of the present invention to provide a relatively inexpensive and easy method of making geometrically complex dies for extruding thin walled cellular structures.

SUMMARY OF THE INVENTION

Briefly, the present invention provides a method of making structures such as extrusion dies from powders. In particular, it relates to a method of making a structure having a plurality of longitudinally spaced recessed channels or feed holes, and having a plurality of narrow intersecting and laterally criss-crossing discharge slots such as an extrusion die for extruding honeycomb structures, from powders. While the invention can be used for fabricating any structure having narrow intersecting slots, for the purpose of the following discussion, the structure will be exemplified by an extrusion die, in particular, a honeycomb extrusion die.

According to the invention, the extrusion die is formed by combining solid state-sinterable powders to form a sinterable green body or preform, machining the green body, and sintering the machined body to form the die. The green body may be first partially machined, followed by partial densification to form a chalk-hard body which may then be completely machined and sintered to form the extrusion die.

In one aspect the invention relates to a method of forming feed holes or recess channels, and slots in green or chalk hard preforms to form extrusion dies.

In another aspect, the present invention relates to a method of forming extrusion dies for extruding complex structures such as thin-walled honeycomb structures having cells of geometrically complex shapes.

In still another aspect, the invention relates to an improved method of forming extrusion dies having tapered slots, feed holes or both.

In yet another aspect, the invention relates to an improved method of forming extrusion dies having very narrow slots.

In this specification:

"pre-form" refers to the formed powder prior to sintering or complete densification;

"chalk hard state" refers to the partially fired state achieved when the preform is fired to a temperature where sintering densification is just beginning. In this state, the preform is strong enough to hold hole-forming pins, and soft enough to be easily machined:

"honeycomb extrusion die" refers to a die having an outlet face provided with a gridwork of interconnected discharge slots and an inlet face provided with a plurality of feed holes or openings extending partially through the die in communication with the discharge slots; and "contra die" refers to a die having feed holes having a gradual or continuous transition of flow cross-sectional area and shape commencing at the entrance portion or end of the feed hole and terminating at the exit portion or end of the feed holes, where longitudinal and lateral flow through discharge slots commences.

DETAILED DESCRIPTION OF THE INVENTION

The die of the invention is made by forming feed holes and slots in green or chalk hard powder pre-forms which are subsequently sintered to produce a dense, strong structure. The pre-forms can be made by dry pressing a powder, usually with the addition of a small amount of binder. Alternatively, the pre-form can be made by the addition of a large amount of binder and plasticizers to metal or ceramic powders to form a batch which can be plastically molded into a die shape, for instance by injection molding. After the pre-form is molded, it is then machined to form a series of spaced, recess channels or feed holes and slots which are so arranged to produce a honeycomb-forming die. Pre-forming of the green body can be done by any suitable powder forming method such as dry or wet processing, isostatic pressing, slip casting, extrusion, injection molding, doctor blading etc. Dense products can be obtained by firing to a closed porosity in diffusible gas or a vacuum and then hot isostatic pressing the product to remove substantially all of the remaining porosity to attain the near theoretical density. For very dense products, hot isostatic pressing is preferred.

The feed holes can be made to any shape by inserting shaped core pins into the green preform or by forming around such pins. To form "contra" feed holes as disclosed in co-assigned U.S. Pat. No. 5,066,215, the holes can be formed by drilling and cutting holes in either the green or chalk hard preform. Because the pre-form is relatively soft, the holes can be cut using a diamond wire saw.

Figure 1:
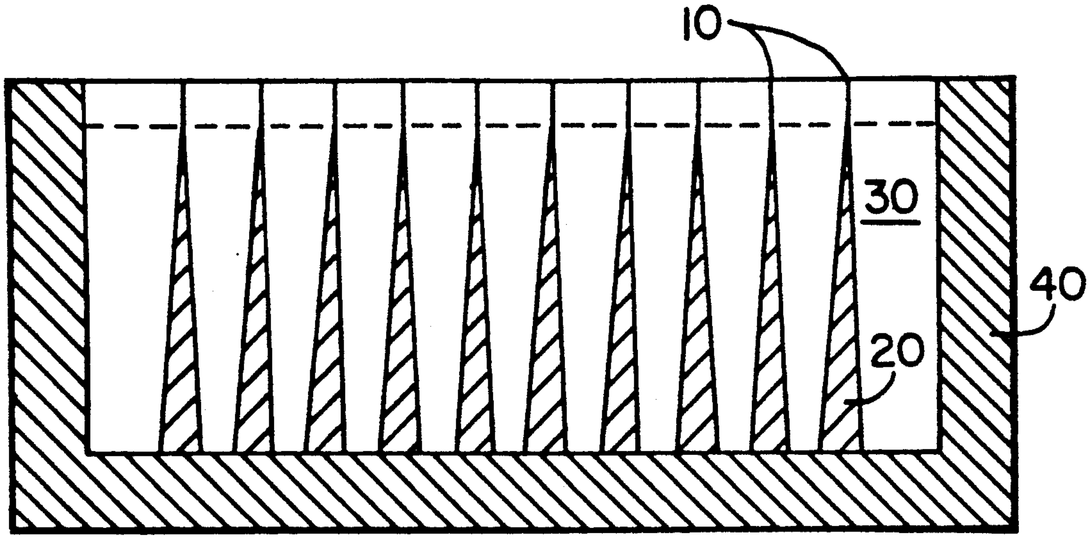
FIG. 1, is a cross-sectional view of the preform showing the core pins and slots.

Alternatively, the feed holes can be formed in a mold 40, by forming the powder over a negative pattern of the feed holes formed by core or shaped pins as shown in FIG. 1. The core pins 20 can be made of metal, wax, plastic, ceramic, or other material which have sufficient rigidity to withstand the molding pressure without distortion. The pin material will also depend on the nature and type of the batch material, that is, whether it is ceramic or metal, and also on the amount of binder used to form the batch. After the mold is formed over the pins, the pins can be removed simply by pulling them out of the formed green batch or pre-form. For ease of removal, it may be desirably to apply lubricants to the pins prior to the molding process. The core pins 20 can also be coated with a material which will burn off to leave a slight gap between the pins and the die material 30 so that the pins 20 can be readily removed to reveal the feed holes.

In addition to the above methods, the pins can be constructed of heated material having a higher thermal expansion coefficient than the pre-form so that upon cooling, the pins will shrink away from the preform leaving a gap and making it easier to pull the pins away from the preform.

Figure 2:
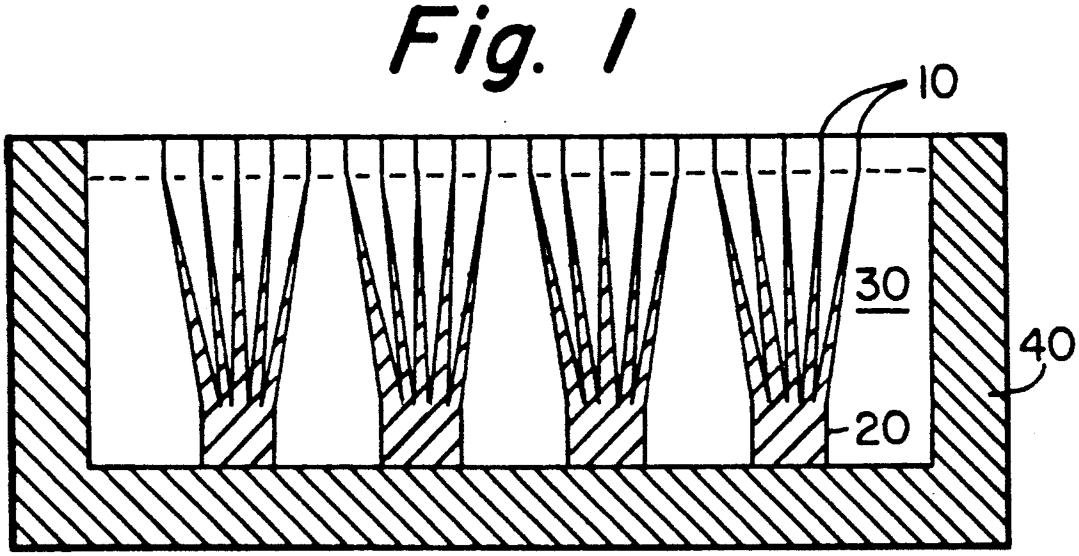
FIG. 2, is a cross-sectional view of the preform showing complex shaped core pins and slots.

For complex feed hole shapes such as shown in FIG. 2, the core pins 20 can be made of any die material 30 which melts on heating. Such meltable pins can be made from metals or alloys with low melting point, high melting wax and/or plastics, or mixtures of metals, alloys, plastics and/or waxes, provided that the meltable pins remain rigid during the molding or forming process to prevent distortion of the pins 20. After the molded preform has sufficiently gelled or hardened, the assembly can then be heated to a high enough temperature to melt the pins (but not the preform), thus leaving the feed holes. Using this method, extrusion dies having complex geometrically shaped and designed feed holes can be formed. Since the meltable pins of this embodiment are not pulled out, but rather, are melted within the preform, dies having very complex geometrically shaped feed holes can be obtained. The pins can also be formed from material which can be dissolved or burned off. Appropriate pin material will depend on such variables as the complexity of the feed hole geometry, the batch composition etc. Alternatively, non-round or other complex feed holes can be formed by programming and feeding a wire saw (e.g., a diamond saw) through a pilot hole. After the core pins are removed or melted to reveal the feed holes, slots 10 can be cut in the die material 30 to connect or communicate with the feed holes.

For some die designs such as the contra die, the feed holes and the discharge slots can be formed at the same time. Since the slotted part of the die is typically more prone to distortion than the feed hole portion during binder burnout, if there is a tendency for the pins to warp, the slotting operation can be done after the preform has been fired to at least a chalk-hard state. Alternatively, slotting can be done after the preform is fully densified (i.e., fully sintered).

For electrically conductive materials which can be slotted using electrical discharge machining (EDM) or electrochemical machining (ECM), the holes can be formed in the green or chalk-hard state, and after sintering to a fully densified state, the slots can be formed using either the EDM or ECM techniques. Slotting by these methods is relatively easy even in the dense or sintered state because unlike the conventional slot cutting method which depends on abrasion, EDM and ECM methods depend on spark erosion and chemical dissolution.

Desirable powders for fabricating the die of the invention must have sufficient strength after sintering, to withstand the pressures normally encountered by dies during extrusion, generally in the range of 2.84–4.27 $kg/m^2$ (2000 to 3000 psi). In particular, suitable powder materials must not distort (slump or sag) during firing.

Preferably, the powders are ceramic powders, more preferably, alumina, zirconia, and their precursors and other wear resistant compositions such as borides and carbides. In a particularly useful embodiment, alumina powders which have been doped with magnesia were found to be particularly effective for fabricating the dies of the invention. MgO is known to control grain size and prevent the growth of exaggerated grains which tend to reduce the strength of alumina during sintering. Additives such as zirconia and high strength fibers can also be added to the alumina to provide added toughness to the body after sintering.

The density of the powders is dictated by the amount of shrinkage desired, as density affects shrinkage. Gamma alumina particles are inherently less dense than alpha particles which also have a different crystal structure from gamma particles. Depending on the desired shrinkage levels, the die of the invention can be fabricated from gamma particles which, when sintered, will change to alpha particles. For less shrinkage, the die can be made from a mixture of gamma and alpha particles, while alpha particles can be used for the least amount of shrinkage.

With respect to particle size, the level of packing depends on the particle size, as coarse powders tend to pack better than fine particles. Like density, the particle sizes can also be mixed to control packing. Shrinkage can also be controlled by the amount of binder in the batch, that is, the powder to binder ratio. For injection molding operations, the lower the ratio, that is, the more the binder, the more the pre-form will shrink. For other applications requiring less binder usage, shrinkage may be controlled by varying the pressing pressure, particle size, and in the case of alumina, the density of the particulates. Some powders do not require binders and can be pre-formed or consolidated into a die shape by pressure alone.

Powders which sinter and densify by solid state diffusion rather than liquid or glass phase sintering, are preferred. Unlike solid state sintering, in liquid state sintering, a liquid phase is present, and sintering occurs as a result of viscous flow and/or solution and dissolution of the material, which may cause the entire body to undergo viscous movement. This is particularly true of glass powders. In addition, liquid may collect at the grain boundaries as is the case with Co-bonded tungsten carbide. In solid state sintering, material movement is caused by the movement of atoms or ions through the crystalline lattice. Unlike materials which sinter by liquid state mechanism, materials which sinter in the solid state are stable and not easily warped, sagged or slumped. As a result, solid state sintered materials are preferred for the die of the invention as they tend to sinter proportionately about the cross section of the die so that slot widths and lengths can be better controlled.

Binders useful for the manufacture of products from powdered starting materials, e.g., from particulate ceramic materials, must meet a number of requirements. For example, the binder must be compatible with the ceramic material such that a flowable dispersion comprising a relatively high loading of the ceramic material in the binder may provided. In addition, the "green" preform produced by shaping the dispersion of ceramic powder in the binder should have reasonable strength such that it can be handled.

Particularly in the case of most batches for ceramic part forming, it is considered that residual carbon, remaining after the removal of binders from the batch material, is detrimental to the development of desirable ceramic microstructure in the final product. It is therefore important that all of the organic constituents of the binder have excellent burn-out properties, such that there will be minimal or no potential for forming carbon during the binder removal process. For some compounds such as carbides, residual carbon may not be a problem and in fact may be desirable during the sintering process.

The binder should also be removable from the shaped ceramic part without incurring distortion or breakage of the part. And, the binder-free preform should have at least a minimum level of strength, yet be sufficiently free of binder residues that defect-free consolidation is readily achievable. Useful binders are preferably organic, even though certain inorganic binders can be used as well. Examples of useful binders include methylcellulose, polyvinyl alcohol, water soluble glue and polyethylene glycol. Depending on the powders and forming mechanism, lubricants such as stearates (e.g., zinc and aluminum stearate), and oils may be used in addition to the binder. In other applications, the binder may act as the lubricant.

In one particularly useful embodiment, high powder loading are achieved by using a thermoplastic organic binder such as disclosed in co-pending, co-assigned patent application U.S. Ser. No. 07/981,262, which comprises essentially of a wax component, serving as a solvent or matrix phase in the binder, and an organic polymer serving as a gel-forming species in the binder. These components are chemically and physically compatible, forming a homogeneous wax/polymer melt wherein the polymer is dissolved or dispersed in the molten wax. However, upon cooling from the melt, reversible gel linkages are formed between the extended polymer chains in the liquid wax such that the binder exhibits the behavior of a cross-linked gel.

In one embodiment, the sinterable ceramic or other inorganic powder is first combined with a powder dispersant and a solvent for the dispersant to provide a powder slurry. In a separate container and separate mixing step, the thermoplastic polymer is combined with a selected low-melting wax component at a temperature above the melting temperature of the wax, in order to provide a wax/polymer mixture (binder) comprising a uniform solution or dispersion of the polymer in the molten wax. The powder slurry is next combined with the wax/polymer mixture and the combination is mixed together at a temperature above the melting temperature of the wax. Mixing is continued for a time at least sufficient to provide a homogeneous dispersion of the powder in the binder mixture, and to evaporate as much of the solvent component as possible, from the slurry. By incorporating the powder component as a slurry rather than as a dry mill addition, higher loadings of the powder in the binder can be achieved.

Completion of the mixing process through solvent removal typically produces a thermoplastic paste exhibiting good fluidity or plasticity for molding or other forming process when heated, and sufficient strength when cooled, to allow for easy handling of the preform provided therefrom.

In one preferred embodiment, the binder formulation consists essentially, in weight percent, of about 30–80% of at least one low-melting volatile wax, e.g., a fatty alcohol wax, 1–40% of at least one high molecular weight organic polymer, 0–20% total of modifying waxes, such as Carnauba wax, and 0–15% total of dispersants, lubricants, release agents and other functional additives having known utility in ceramic batches for molding or extrusion.

Certain alumina powders can be fabricated with little or no binder because these powders pick up moisture from the air due to their small particle sizes. For such powders, it may be necessary to add a small amount of binder (preferably, less than 5%), which may also function as a lubricant to give the pre-form some strength for ease of machinability if the preform is to be machined in the green state. If the preform is to be machined in the chalk-hard state, then it may not be necessary to add a binder.

If the pre-form contains sufficient binders and plasticizers, it can be machined with high speed steel or tungsten carbide saws and drills. Also, since the preform is soft, slotting can be done more easily than in metals, especially using saws in the 4–6 mil (0.0102–0.01524 cm) range. Feed holes can also be readily drilled with standard twist drills in batches having high binder content. Tungsten carbide saws and drills can also be used to machine preforms made from hard ceramic powders having low binder content. For soft-fired ceramics, diamond tooling can be used.

Given the right powders, additives and sintering atmosphere, powder pre-forms tend to shrink to near their theoretical density during sintering. therefore, slots cut into the pre-forms will become narrower during sintering. As a result, dies having very narrow slots can be obtained using the method of the invention since linear shrinkages in pre-forms are typically in the range of 10-25% or higher.

I have found that ultra-thin slots can be formed by selecting certain powder particles. For example, crystals of gamma alumina are light and fluffy, finer and less dense than alpha alumina crystals. Even at high pressing pressures, gamma alumina particles pack to form light (i.e., low density) parts. Thus, when bodies are made from gamma alumina, shrinkage occurs from both crystal transformation (gamma to alpha), and from the low green density. This particularly useful embodiment of the invention is illustrated below.

The density of gamma particles is about 3.6 g/cm$^3$. Upon sintering at about 1050° C. or higher, gamma particle convert irreversibly, to alpha particles which are inherently denser, having a density of about 4 g/cm$^3$, resulting in shrinkage. In addition, gamma particles, as well as some other precursor aluminas, can have very fine particle sizes with surface areas of over 200 m$^2$/g. When the particles are used to make a preform, they produce a low density preform since they do not pack to a high density. However, upon sintering, the gamma particles- or alumina precursor-derived preforms can sinter to near theoretical density and produce linear shrinkages sometimes in excess of 30%. Thus, a 0.0089 cm (3.5 mil) slot die can be achieved by cutting a 0.0127 cm (5 mil) slot in a preform. This results in a significant advantage in the die manufacturing process as it eliminates the need for very fine saw blades which tend to be fragile and less rigid.

Dies having tapered slots can also be made by varying the density or packing of the powder particles in different parts of the preform. The density of the preform can be varied for example, by pressing various parts of the preform with different pressures. Alternatively, the powder can be extruded or tape cast into layers which can then be stacked and pressed together to bond them into a monolithic structure before machining. For water-based preforms, the layers can be bonded by pressing the layers together. For thermoplastic preforms, the layers can be bonded by heating sufficiently to bond the layers through melting. The amount of shrinkage of each layer can be controlled by using powders of different shrinkages and by varying the amount of binder.

Figure 3A:
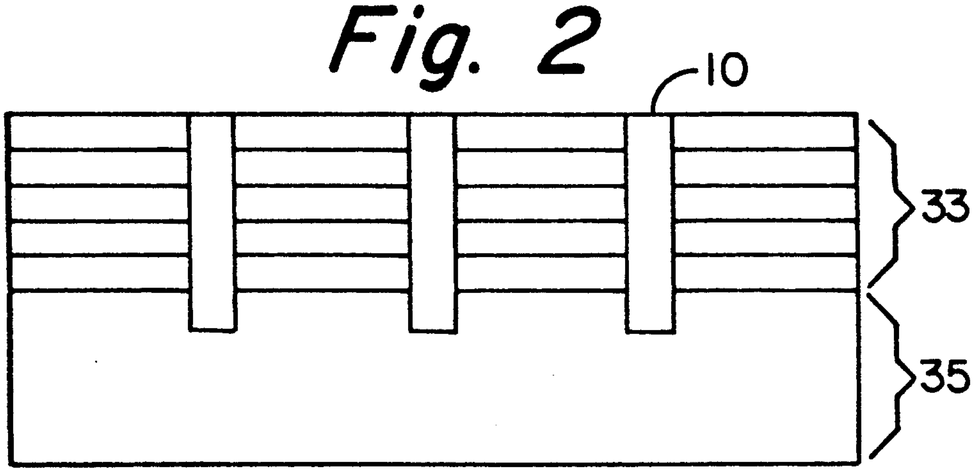
FIG. 3*a*,, is a diagram showing layers of powders having different shrinkages for forming the tapered slots of FIG. 3*b*.
Figure 3B:
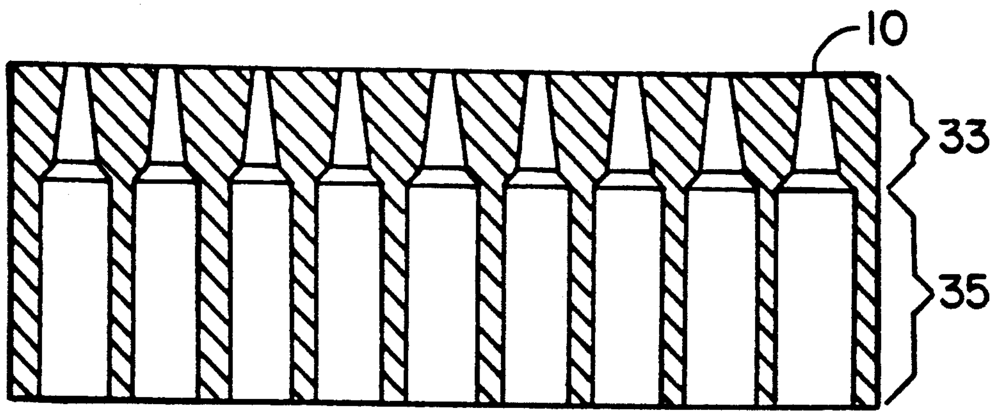
Figure 4:
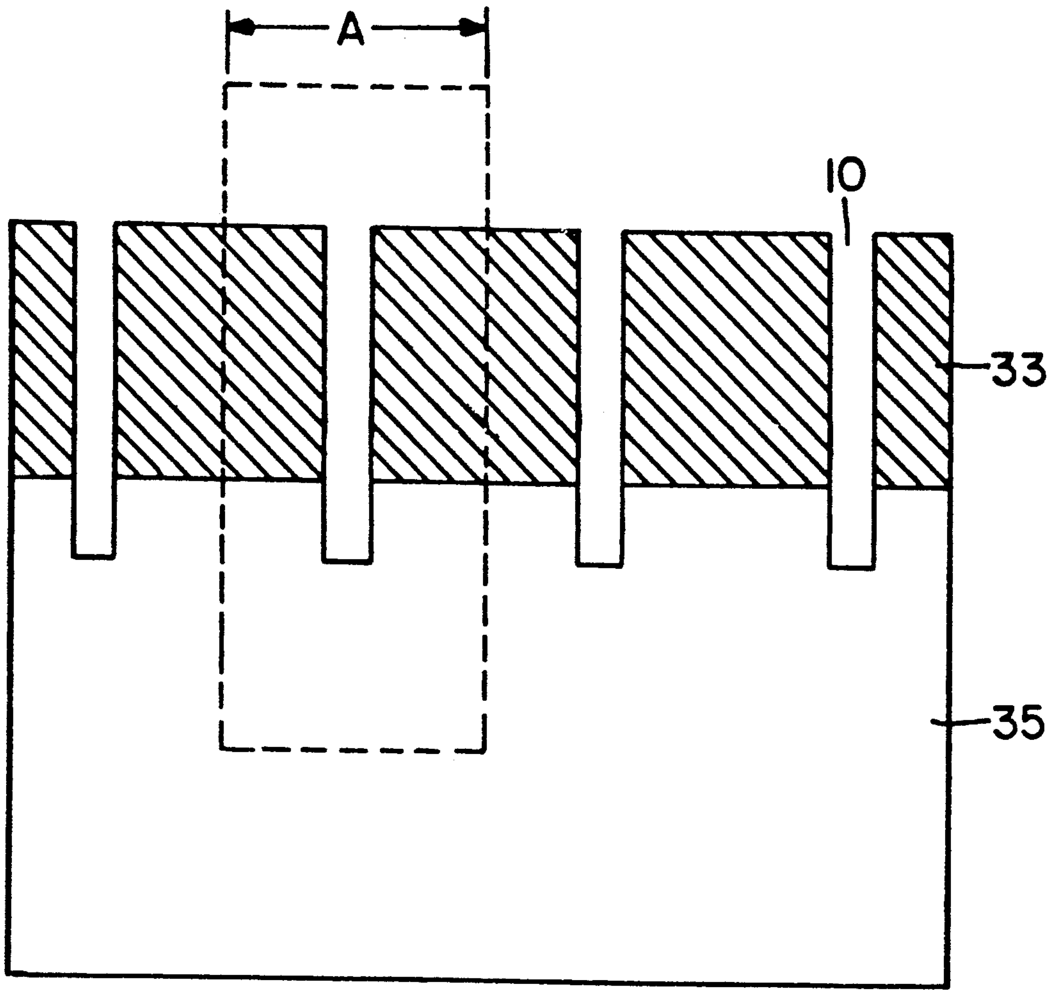
FIG. 4, is a diagram of a part of a billet showing a "unit shrinkage cell" for determining slot shrinkages when the slots and hole portions of a die are formed from powders having different shrinkages.
Figure 5:
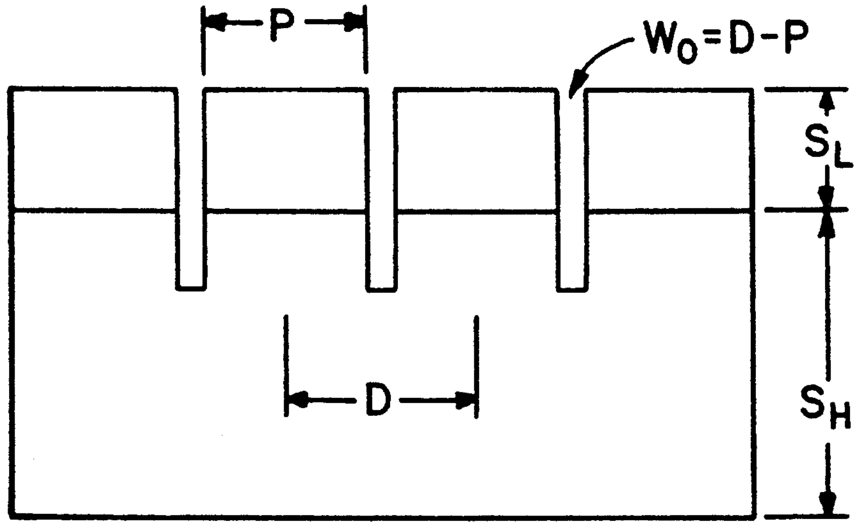
FIG. 5, is a diagram illustrating the technique for determining the final slot width of a totally densified or sintered die.
Figure 6:
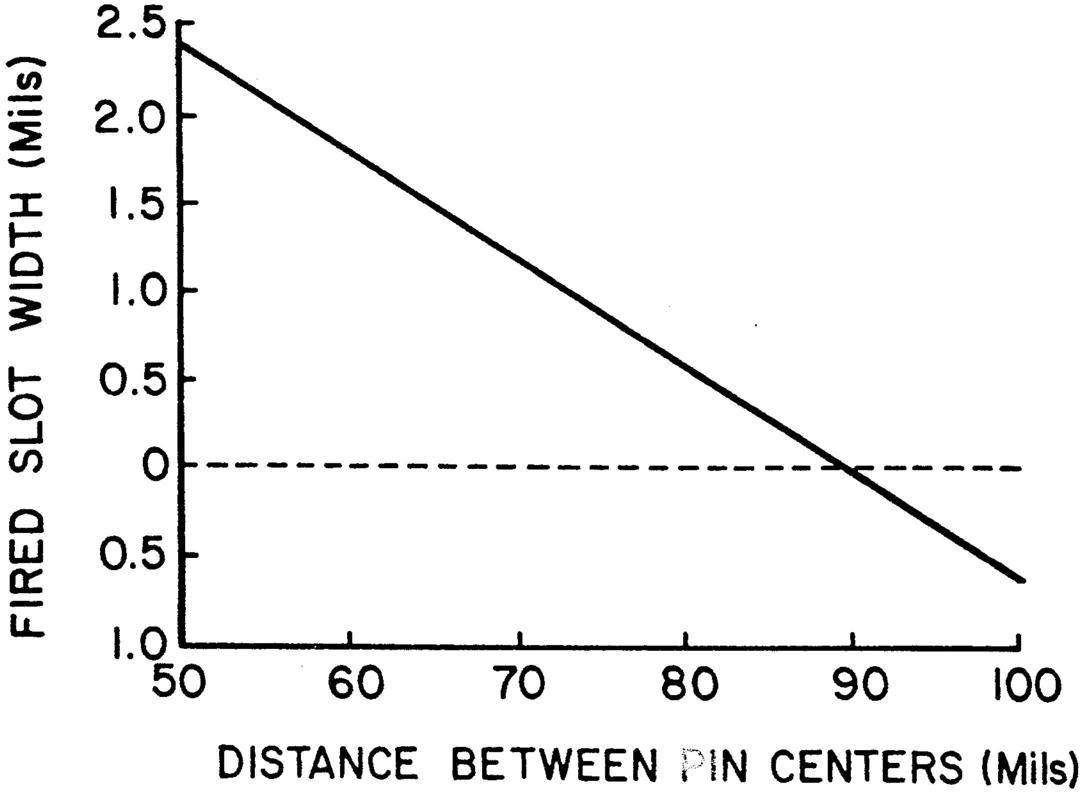
FIG. 6, is an illustrative graph showing how fired slot width varies with distance between pin centers for given initial slot width and material shrinkages.

In one particularly useful embodiment, dies having ultra-thin slots are made by using layers of powders having different shrinkages as illustrated in FIGS. 3-5. Referring now to FIG. 4, the thickness of the layer of lower shrinkage material may be less than or equal to, preferably, less than, the depth of the slots. Referring now to the unit shrinkage cell indicated by the dotted lines in FIG. 4, and FIG. 5, the width of the cell is the distance between pin centers in a direction normal to the slot being considered. Since the top of the pins are structurally isolated in a horizontal direction from the higher shrinkage base material, as the body shrinks during sintering the slot walls move together as the center lines of the pins move together. Also, the pins shrink less in the upper portion than at the root. In addition, the distance the centerlines of the pins move together is proportional to the distance between the centerlines. The equations for determining the original (pre-sintering) and final (post-sintering) slot width are given by:

$$W_o = D - P \quad (1)$$

$$W_F = D(1 - S_H/100) - P(1 - S_L/100) \quad (2)$$

where $W_F$ is the slot width after sintering, D is the spacing of the slots before sintering (D is also the distance between pin centers), P is the width of the pin before sintering, $S_H$ is the percent firing shrinkage of high shrinkage material, and $S_L$ is the percent firing shrinkage of low shrinkage material. The relationship between these variables is shown in FIG. 5. Thus, the final slot width depends on the size of the pin, and the cell density, that is, the number of cells/in$^2$ (cpsi) as indicated by D and P. By setting the final slot width ($W_F$) to 0, the values of P, D, $S_H$, and $S_L$ at which slot closure will occur can determined for a given die. This is also illustrated by FIG. 6 which is a plot of how fired slot widths vary with distance between pin centers (also between slot centers) D, for a sample with an original slot width of 6 mils (0.01524 cm), using a 10% shrinkage material for the slot portion and a 16% shrinkage material for the hole portion. As shown, the slot width goes to 0 when D, the distance between pin centers (or the distance between slot centers) is about 90 mils (0.2286 cm). Therefore, for this die, the maximum distance between pin centers or slot centers should be less than 90 mils (0.2286 cm) to prevent slot closure. Further, differences in the thickness of the low shrinkage section of the pins can also have an effect on the width of the slots. While calculations such as these for predicting the final size of a slot in a laminated die will give a good estimate of the final width of the slot after sintering, the exact width for a given set of die design and powder variables is best determined by experimentation.

I have found that the slot narrowing effect is more pronounced with low density cell dies (low cpsi) than with high cell density or fine cell dies (high cpsi). Therefore, slots made in a 200 cell/in2 (31 cells/cm$^2$) unsintered preform would be narrower after sintering than those of a 400 cell/in2 (62 cells/cm$^2$) preform. For instance, if the material in the upper portion of the pins (i.e., the slot portion) shrinks 10% during sintering and the material in the lower portion of the pin area (i.e., the hole portion) and the remaining part of the preform shrinks 16% during sintering; and assume an initial slot width of 6 mils (0.01524 cm) and a 200 square cel)/in2 (31 cells/cm$^2$) preform, the pin size would be 64.71 mils (0.164 cm) across the flats (i.e., the dimension from one edge of the pin to the other). Referring to FIG. 4, the distance A, between the pin centers would be 70.71 mils (0.18 cm). After sintering, the distance between pin centers (also the width of the "unit shrinkage cell") would be 59.40 mils (0.151 cm), and the pin size at the top would be 58.24 mils (0.148 cm). Since two pin halves are included in the "unit shrinkage cell" the final width of the slot after sintering would be 59.40 mils (0.151 cm) minus 58.24 mils (0.148 cm) or a 1.16 mils (0.0029 cm) (that is, about one third of the thickness of a sheet of paper). Comparatively, if the die were made entirely of material with 10% shrinkage, the final slot width after shrinkage for a 6 mil (0.01524 cm) slot in the preform would be 5.4 mils (0.0137 cm). Similarly, if the entire die were made from material with 16% shrinkage, the final slot width would be 5.04 mils (0.0128 cm). Thus using a layer of material for the end of the pins which shrinks less than material in the rest of the preform results in a significant decrease in slot widths after sintering. Calculations of slot shrinkage for a 400 cpsi (62 cells/cm$^2$) preform with an initial or unsintered slot width of 6 mils (0.01524 cm) (using the same materials used for the 200 cpsi (31 cells/cm$^2$) die above, that is, 10% and 16% shrinkage materials), show that the final slot width would be 2.4 mils (0.0061 cm). This illustrates that the final slot width is related to the cell density. The higher the cell density the wider the slots will be after sintering relative to a preform with a lower cell density.

Figure 7:
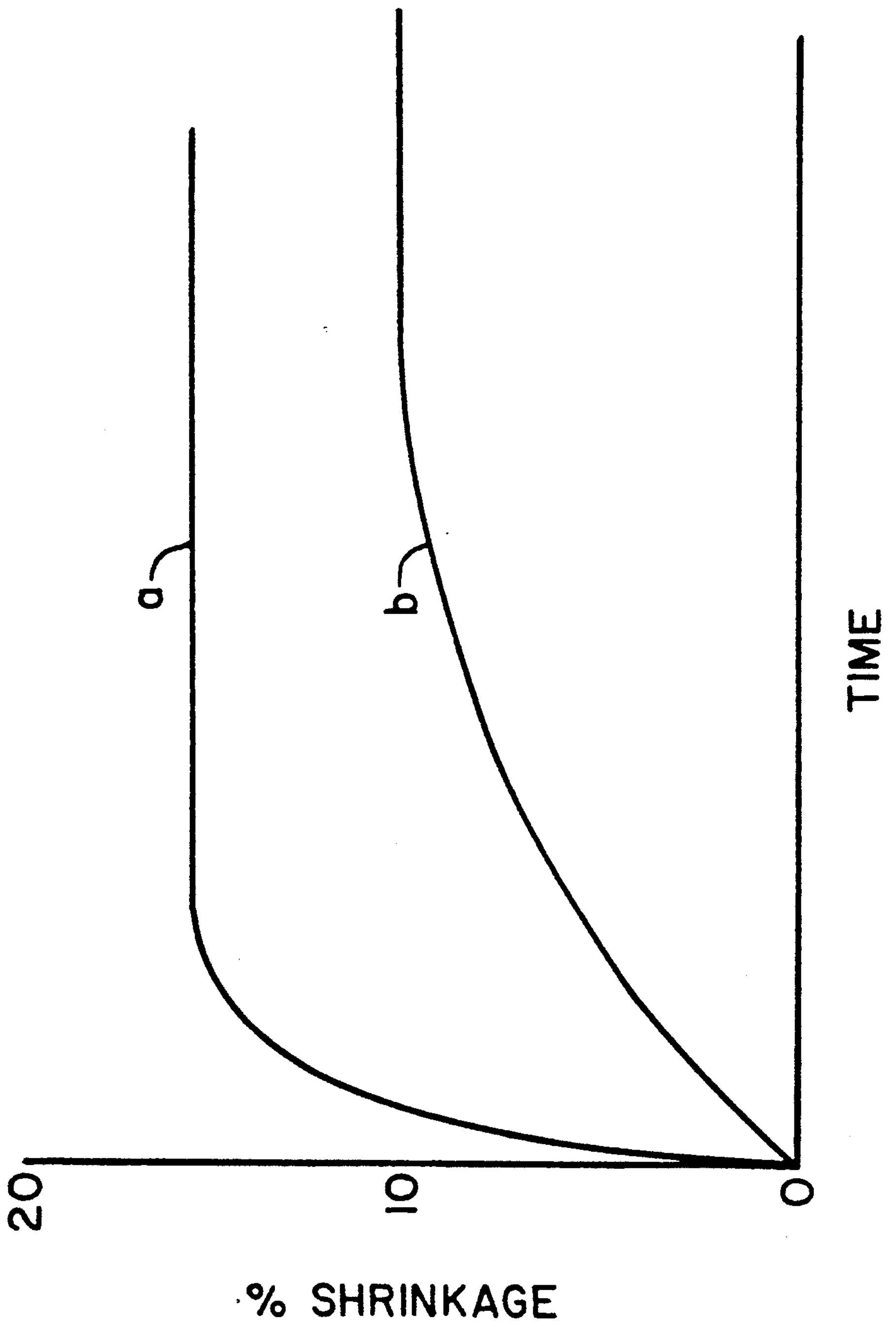
FIG. 7, is a schematic representation of shrinkage curves for fine and coarse powders.

In some instances, for example, when the die is made with both fine and coarse powders, slot closure may occur even though the above equation and FIG. 5 do not indicate or predict closure. One reason for this is that typically, fine powders tend to shrink and densify more rapidly than coarse powders. This is illustrated by FIG. 7 which is a schematic representation of shrinkage curves for fine and coarse powders (lines (a) and (b) respectively), having firing shrinkages of about 15 and 10% respectively. As the fine powder approaches its maximum shrinkage and density, the coarse powder has shrunk only about 5% (i.e., 50% of its maximum shrinkage.) If the initial slot is not wide enough, slot closure can occur at this time, and some sintering together of the slot walls can occur. As further sintering of the coarse powder occurs, some of the slot walls which are the least sintered together can pull apart, leaving a die with some slots which are sintered closed and some which are wider than expected. This type of slot closure can be prevented by employing several techniques. For example, the coarse, low shrinkage powder can be doped with a shrinkage promoter such as $TiO_2$ to promote initial shrinkage of the coarse material. Another technique is to make the powder preform blank with only one type of powder and then dip one edge of the blank (the slot portion), in an alumina-containing solution such as Chlorohydral (a water-based solution which can contain up to 23–24% alumina, available from Reheis Chemical Co.). Preferably, the solution is soaked in to a soft-fired (chalk-hard) preform to a depth less than the pin depth. (the alumina can be applied in multiple dips in the solution with decomposition firings between each dip) When the preform is machined and fired, the area impregnated with the Chlorohydral would shrink less than the rest of the body, but should shrink at about the same rate or faster than the rest of the body.

Alternatively, mixtures of fine and coarse powders can be used for the low shrinkage portion, with the result that the finer powders in the mixture would promote early shrinkage.

EXAMPLES

1. Fluid Batch

In the following examples, the final mixing of the ceramic batches was typically carried out at temperatures in the range of about 120°–180° C., with subsequent molding of the batch normally being carried out at batch temperatures in the range of about 80°–180° C. Batch compositions in Tables I to III are reported in parts by weight, and except where otherwise noted the batch components employed are the commercially available materials set forth in the Components Key section following Table I.

Table I sets forth illustrative examples of ceramic batches comprising thermoplastic reversible gel binders which are particularly well suited for forming by injection molding processes. The ceramic powders selected for processing in Table I are zirconia ($ZrO_2$) powders, and the proportions of powders present are reported in parts by weight of the batch. Also reported in Table I are the components utilized in formulating the thermoplastic binders present in the batches, with the proportions of binder components also being reported in parts by weight. Finally, the identity and commercial source for some of the specific binder components are shown.

TABLE I

| | 1 | 2 | 3 | 4 |
|---|---|---|---|---|
| Ceramic Powder (pbw) | | | | |
| Zircoa 5027 Zirconia | 1037 | 1037 | — | — |
| Zircoa A-grain Zirconia | — | — | 1066 | 1237 |
| Total Solids (pbw) | 1037 | 1037 | 1066 | 1237 |
| Binder Components (pbw) | | | | |
| [a]styrene-ethylene/butylene-styrene tri-block copolymer | 28.9 | — | — | 35 |
| [b]acid functional butyl methacrylate copolymer | — | — | 40 | — |
| [c]ultra high molecular weight polyethylene | — | 3.9 | — | — |
| [d]fatty alcohol wax 1 | 33.6 | 46.2 | 29 | 32 |
| [e]fatty alcohol wax 2 | 22.1 | 30.0 | 19 | 21 |
| [f]Carnauba wax | 11.9 | 16.4 | — | — |
| [g]oxidized polyethylene wax 1 | — | — | 12 | — |
| [h]oxidized polyethylene wax 2 | — | — | — | 12 |
| [i]dispersant | 3.5 | 3.5 | 2.28 | 2.47 |
| Total Binder (pbw) | 104 | 80 | 102.28 | 102.47 |
| Volume % Solids | 67% | 67% | 68% | 66% |

| Components Key | |
|---|---|
| [a]Kraton ® G1650 elastomer | ShellChemical Company |
| [b]Neocryl ® B723 copolymer | ICI Americas, Inc. |
| [c]HiFax ® 1900 polyethylene | Himont |
| [d]octadecanol wax | Conoco Inc. |
| [e]hexadecanol wax | Conoco Inc. |
| [f]Carnauba wax | Ross Chemical Co. |
| [g]AC-6702/AC-330 wax blend | Allied Corp. |
| [h]AC-656 wax | Allied Corp. |
| [i]Hypermer ® KD-3 dispersant | ICI Americas, Inc. |

Compositions 3 and 4 in Table I demonstrate the particularly preferred binder formulations for the injection molding of the ceramic die of the invention. These formulations exhibit viscosities well below the 10,000 poise level needed for good injection molding performance, and demonstrate excellent mold release behavior due to the inclusion of the optional oxidized polyethylene wax additives as mold release aids.

The binder formulations in Tables II and III below exhibit rheologies which are particularly well suited for extrusion processing. Moreover, the compositions in Table II provide exceptionally good extensional flow in the batch reforming region, such that they can provide extruded or otherwise processed green ceramic sheets which are highly amenable to thermoforming after extrusion. The powdered glass utilized in the Table II formulation is a sodium aluminosilicate glass commercially available as Code 0317 glass from Corning Incorporated.

TABLE II

| | 1 | 2 | 3 |
|---|---|---|---|
| Ceramic/Glass Powder (pbw) | | | |
| Zircoa 5027 Zirconia | 1359 | 1178 | — |
| Silicate Glass | — | — | 612 |
| Total Solids (pbw) | 1359 | 1178 | 612 |
| Binder Components (pbw) | | | |
| Kraton ® G1650 elastomer | 30 | — | 30 |
| Neocryl ® B723 polymer | — | 30 | — |

TABLE II-continued

| | 1 | 2 | 3 |
|---|---|---|---|
| octadecanol wax | 35 | 32 | 35 |
| hexadecanol wax | 22.65 | 20 | 22.65 |
| Carnabua wax | 12.35 | 18 | 12.35 |
| Hypermer ® KD-3 dispersant | 8.75 | 7.66 | — |
| [j]Dispersant 2 | — | — | 2.0 |
| Total Binder (pbw) | 108.75 | 107.66 | 102 |
| Volume % Solids | 68% | 66% | 68% |

[j]Emphos TM PS-21A surfactant, Witco Chemical Corp.

TABLE III

| | 1 | 2 |
|---|---|---|
| Ceramic Powder (pbw) | | |
| Zircoa 5027 Zirconia | 1005 | 1037 |
| Total Solids (pbw) | 1005 | 1037 |
| Binder Components (pbw) | | |
| [k]ethylene/acrylic acid copolymer | 20 | — |
| Kraton ® G1650 elastomer | — | 35 |
| Octadecanol wax | 40.01 | 32 |
| Hexadecanol wax | 25.88 | 21 |
| Carnauba wax | 14.11 | 12 |
| Hypermer ® KD-3 dispersant | 7.65 | 3.5 |
| Total Binder (pbW) | 107.65 | 104 |
| Volume % Solids | 61% | 67% |

[k]Primacor ® 3340 acrylic acid copolymer, Dow Chemical Co.

Die preforms produced from the above batches can then be machined either in the green state or in the chalk-hard state to form the dies of the invention. Similarly, the holes and the slots may be formed either before or after the dewaxing step described below.

Preferred dewaxing procedures for ceramic parts formed from the batch formulations of Tables I–III above generally comprise at least the following stages: (a) slow heating (e.g., 15° C. per hour or less) to the lower limit of the low-melting wax volatilization range (about 110° C.), (b) slow heating or long dwell periods in the temperature range of relatively rapid low-melting wax volatilization (e.g., 4–20 hours at temperatures in the range of about 110°–165° C.), and (c) relatively slow heating or long dwell periods at temperatures in the upper temperature range for dewaxing (e.g., 10–40 hours at temperatures in the range of about 165°–230° C.).

2. Low Binder Batch (for pressing)

In the following examples, dies were formed using sinterable alumina particles which have been doped with MgO to control grain size and prevent exaggerated grain growth, in the composition given in Table IV below:

TABLE IV

| | |
|---|---|
| *AU-16 Alumina (Alcoa) | 2841.08 g |
| MgO (Mallincrodt AR) | 3.01 |
| XUS 40303.00 Binder (Dow Chemical) | 98.02 |
| Carbowax 400 | 58.81 |
| Darvan C | 14.80 |
| Deionized water | 3693.00 |

*A-16 alumina is an alpha alumina which is readily available, is relatively inexpensive, has a relatively large shrinkage (16-19%), and can be sintered to high densities.

After spray drying, the batch was isostatically pressed into a block in a rectangular rubber mold at 20,000 psi (28.4 kg.m$^2$). Smaller blocks (preforms) were cut from this block using a diamond saw or a band saw. The preforms were soft fired in air at about 1050° C. with a two hour holding period, after which the samples were soft enough to be readily drilled or slotted, but strong enough to be easily handled and machined.

In the soft-fired (chalk-hard) state, holes were drilled into one face of the preform using a diamond tipped tungsten carbide twist drill, 0.052 in (0.132 cm) in diameter. Drilling was done at a speed of 1400 rpm with an impulse motion using distilled water as the flushing medium.

Slots, 0.15" (0.38 cm) deep and 0.075" (0.19 cm) on center were then cut to intersect every other hole using a semiconductor slicing saw 0.006" (0.01523 cm) thick and 6" (15.24 cm) diameter, using distilled water as a flushing medium. Saw speed was 2875 rpm and the motion of the saw axis with respect to the preform was 2 inches/min (5.08 cm/min).

The machined preforms were dried and then fired in hydrogen for 2 hours at 1650° C. After sintering, slot sizes were measured with a Nikon Measurescope 20. The average slot width decreased from about 0.0093" (0.0236 cm) before sintering, to about 0.0078" (0.0198 cm) after sintering for an average shrinkage or reduction of about 16%.

The dies formed by the above methods were then subjected to actual use conditions by using the dies to extrude a ceramic batch of the following composition:

| | |
|---|---|
| Kaopaque 10 clay | 1020.0 g |
| Methocel A4M (Dow Chemical) | 30.6 |
| Sodium stearate | 10.2 |
| Deionized water | 357.0 |

The batch was mixed in a Brabender Plasticorder using the standard mixing head, and extruded using the dies described above, at extrusion pressures varying from about 800 psi to 2400 psi (1.13 to 3.41 kg/m$^2$), the maximum pressure of the extruder.

To form a honeycomb structure, the batch material was fed to the die under pressure so that the extrudable material flows longitudinally through the feed holes in the inlet face of the die and thereby directed to the interconnected, laterally criss-crossing discharge slots communicating with the outlet face, wherein a portion of the material flows laterally within the slots to form a continuous mass before being discharged longitudinally from the outlet face to form a thin-walled honeycomb structure having a plurality of cells or open passages extending therethrough.

In all cases, well-formed cellular extrudates were obtained and the dies performed satisfactorily at all extrusion pressures.

3. Ultra-thin Slots using Differential Shrinkage

FIGS. 3*a* and 3*b* demonstrate the differential shrinkage method for making ultra-thin or narrow slots. Batches using powders of A-15 and A-16 alumina were made up using the binders described in Table IV. In FIG. 3*a*, the top layers 33, were formed using A-15 powders, an alpha alumina having a firing shrinkage of about 12–13% during sintering. It is known that the amount of shrinkage for a particular powder can vary depending on the binder and sintering aids used, the pressing pressure, the firing time, temperature, firing atmosphere etc. The lower layer 35, was prepared using A-16 powders, alpha alumina having shrinkage of 16–19%. 200 g batches of A-15 powder were prepared using the same binder composition as for the A-16 and hand granulated through a 20 mesh nylon screen after drying to a moist but not sticky state at 100° C.

Layered samples were prepared by first placing a smooth 3 g layer of the lower shrinkage A-15 batch in a 1-in plunger type die and pressing to 7800 psi (11.1 kg/m$^2$). A 13.4 g layer of the higher shrinkage A-16 batch was then placed in the die and consolidated at 7800 psi (11.1 kg/m$^2$). This laminated preform was then placed in a thin walled rubber bag and pressed at 30,000 psi (42.67 kg/m$^2$). in an isostatic press. The samples were then fired for 2 hours at a temperature of 1250° C. to burn out the binder and provide soft-fired (chalk-hard) samples (or slugs) for slotting and/or hole forming. For this experiment, holes were not drilled in the dies since the purpose here was to determine slot shrinkages. Holes would usually be drilled before binder burnout or after soft-firing and before slotting to minimize pin breakage.

Using a 100 grit diamond wheel, the samples (slugs) were machined on a surface grinder to form blocks of preform measuring about 0.6"×0.6" (1.524×1.524 cm) by about 0.5" (1.27 cm) high. The side dimensions were calculated to produce even sized pins over the entire top, so the exact dimensions varied slightly with each cell density. A 6 mil (0.01524 cm) diamond saw was used for slitting. Slots 100 mils (0.254 cm) deep were made in two directions to produce pins. Three dies (A, B and C) with slot centerlines of 50, 75, and 100 mils (0.127, 0.19, and 0.254 cm respectively), corresponding to cell densities in the machined state of 400, 178, and 100 cpsi (62, 27.6, and 15.5 cells/cm$^2$) respectively were made using the ceramic batch of Table IV. To prevent distortion, the slots were uniformly spaced over the surface so that pin sizes were all equal. After slitting for slots, the dies were then fired in a hydrogen furnace at a rate (ramp) of about 75° C./hour to 1650° C., held at 1650° C. for 2 hours, and cooled at the normal furnace cooling rate. After sintering, the cell density as measured by the number of cells/in2 of the dies increased from the pre-sintering density due to shrinkage.

Slot widths were measured with a Nikon Measurescope 20 before and after firinq. Average slot widths measured before and after sintering for all three sample dies were as follows:

TABLE V

| Sample | Slot Width (mils) Chalk-hard | Fully Sintered |
|---|---|---|
| A | 7.7–7.9 | 3.7–3.8 |
| B | 8.7–9.2 | 3.4–4.0 |
| C | 7.8–8.1 | * |

*Many of the slots were sintered closed. The reason for this is that the finer alumina hole portion of the die sinters sooner than the coarser alumina used for the pins, as previously discussed.

After firing, a tapered transition is observed at the interface between the low and high shrinkage portions of the dies, becoming gradually thinner from the root to the exit end of the pin.

In addition to the layering method, bodies with different shrinkage zones can also be made by other methods. For example, as previously described, one surface of a soft-fired pre-form or blank could be saturated with an alumina containing solution to fill the pores of the preform. Upon decomposition by firing, the residual alumina would increase the green density and thus reduce the firing shrinkage. Multiple dips can be made for a more pronounced effect. Alternatively, tapes of materials having different shrinkages can be cast, stacked, and bonded to form a monolithic die.

It should be understood that this invention is not to be unduly limited to the illustrative embodiments set forth herein.

I claim:

1. A method of forming an extrusion die from powders, the method comprising:

compounding solid state sinterable powders by pre-milling the powders with a dispersant and a solvent to form a mixture;

dissolving or dispersing a high molecular weight thermoplastic polymer in a wax component at a temperature above the melting temperature of the wax to form a molten wax/polymer binder;

adding the pre-milled powder mixture to the molten wax/polymer binder at a temperature sufficient to blend the powder and molten binder;

volatilizing the solvent to produce a thermoplastic paste;

shaping the paste to form a green sinterable preform;

machining the green preform into the shape of an extrusion die; and sintering the machined preform to form the die.

2. The method of claim 1, wherein the sinterable powders are selected from the group consisting of metals and ceramics.

3. The method of claim 2, wherein the sinterable powders are selected from the group consisting of alumina, zirconia, precursors of these oxides and alumina with added zirconia.

4. The method of claim 3, wherein the sinterable powders are selected from the group consisting of gamma alumina, alpha alumina, and their precursors.

5. The method of claim 3, wherein the sinterable powders comprise alumina doped with magnesia.

6. The method of claim 1, wherein prior to machining, the preform is fired to a chalk-hard state.

7. The method of claim 1, further comprising the step of dewaxing.

8. The method of claim 1, wherein the green preform comprises an inlet and an outlet portion, and wherein said machining of the green preform comprises, forming a plurality of longitudinally spaced feed holes in the inlet portion of the preform, and a plurality of intersecting and laterally criss-crossing discharge slots in the outlet portion of the preform, such that the discharge slots are in communication with the feed holes.

9. The method of claim 8, wherein following the formation of the feed holes, the green preform is sintered to near its theoretical density prior to formation of the discharge slots.

10. The method of claim 8, wherein the preform is a porous structure.

11. The method of claim 10, wherein following formation of the feed holes, the green porous preform is partially densified to a chalk hard state prior to formation of the discharge slots.

12. The method of claim 11, wherein part of the porous preform is contacted with alumina-containing solution prior to sintering.

13. A method of forming an extrusion die from powders, comprising the steps of:

forming a first slurry comprising low shrinkage sinterable powders;

forming a second slurry comprising high shrinkage sinterable powders;

shaping the first and second slurries to form a green laminated preform consisting of a first layer of the first slurry formed on a second layer of the second slurry, and a junction between said first and second layer;

machining the green preform to form to form a plurality of longitudinally spaced feed holes in the second layer, and a plurality of intersecting and laterally criss-crossing discharge slots in the first layer, such that the slots are in communication with the feed holes; and sintering the machined preform to form the die.

14. The method of claim 13, wherein the sinterable powders are ceramics.

15. The method of claim 13, wherein the sinterable powders are selected from the group consisting of alumina, zirconia, precursors of these oxides and alumina with added zirconia.

16. The method of claim 15, wherein the sinterable powders of at least one layer are selected from the group consisting of gamma alumina and gamma alumina precursors.

17. The method of claim 15, wherein the sinterable powders comprise alumina doped with magnesium.

18. The method of claim 13, wherein the low shrinkage powders are further doped with $TiO_2$ prior to compounding to form the first slurry.

19. The method of claim 18, wherein following the formation of the feed holes, the green preform is partially densified to a chalk-hard state prior to formation of the discharge slots.

20. The method of claim 18, wherein following the formation of the feed holes, the green preform is sintered to a fully densified state prior to formation of the discharge slots.

21. The method of claim 13, wherein the second mixture has higher shrinkage than the first mixture.

22. A method of forming an extrusion die comprising a plurality of longitudinally spaced feed holes and laterally criss-crossing discharge slots, the method comprising the steps of:

providing a mold having a series of core pins defining a reverse or negative pattern of said feed holes;

shaping sinterable powders in said mold to form a preform such that the length of the core pins is less than the thickness of the preform;

removing the core pins to reveal feed holes on one portion of the preform;

machining the opposite portion of the preform to form intersecting and laterally criss-crossing discharge slots such that the slots communicate with said feed holes; and sintering the preform to form the extrusion die.

23. The method of claim 22, wherein the core pins are made of material having higher thermal expansion than the preform.

24. The method of claim 22, wherein the core pins are made of a material selected from the group consisting of low melting metal, ceramics, waxes, plastics and mixtures thereof.

25. The method of claim 22, wherein the sinterable powders are selected from the group consisting of alumina, zirconia, precursors of these oxides and alumina with added zirconia.

26. The method of claim 25, wherein the sinterable powders are selected from the group consisting of gamma alumina and gamma alumina precursors.

27. The method of claim 25, wherein the sinterable powders are doped with MgO.

28. A method of forming an extrusion die from powders comprising:

doping solid state sinterable powders with MgO;

compounding the doped powders with a binder to form a mixture;

spray drying the mixture;

isostatically pressing and shaping the mixture to form a green sinterable preform having an inlet and an outlet portion;

drying the preform into a chalk-hard or soft-fired state;

forming a plurality of longitudinally spaced feed holes in the inlet portion of the preform;

forming a plurality of intersecting and laterally criss-crossing discharge slots in the outlet portion of the preform; such that the discharge slots are in communication with the feed holes; and sintering the preform to form the die.

29. The method of claim 28, wherein the discharge slots are 0.38 cm (0.15") deep, 0.0236 cm (0.0093") wide, and 0.19 cm (0.075") on center.

* * * * *

UNITED STATES PATENT AND TRADEMARK OFFICE

CERTIFICATE OF CORRECTION

PATENT NO. : 5,308,556

DATED : May 3, 1994

INVENTOR(S) : Rodney D. Bagley

It is certified that error appears in the above-indentified patent and that said Letters Patent is hereby corrected as shown below:

Col. 5, line 36, insert "be" after "may"

Col. 11, line 55, "*AU-16" should be "*A-16"

Col. 12, line 11, "(0.01523 cm)" should read "(0.01524 cm)"

Claim 24, "metal" should be "metals" Claim 24

Signed and Sealed this

Sixth Day of December, 1994

Attest:

BRUCE LEHMAN

*Attesting Officer* *Commissioner of Patents and Trademarks*